(12) United States Patent
Kwon

(10) Patent No.: US 7,496,377 B2
(45) Date of Patent: Feb. 24, 2009

(54) MEMORY DEVICE IN MOBILE PHONE

(75) Inventor: Taeyoun Kwon, Seoul (KR)

(73) Assignee: Samsung Electronics Co., Ltd (KR)

( * ) Notice: Subject to any disclaimer, the term of this patent is extended or adjusted under 35 U.S.C. 154(b) by 475 days.

(21) Appl. No.: 10/020,652

(22) Filed: Dec. 13, 2001

(65) Prior Publication Data
US 2003/0050087 A1 Mar. 13, 2003

(30) Foreign Application Priority Data
Sep. 7, 2001 (KR) ............... 2001-54988

(51) Int. Cl.
H04M 1/00 (2006.01)
(52) U.S. Cl. ............ 455/550.1; 455/418; 455/575.1; 711/103
(58) Field of Classification Search ......... 455/418, 455/419, 420, 550.1, 575.1, 90.1, 425, 558, 455/556.1, 557, 552.1, 553.1; 717/169, 101, 717/102, 103, 104, 105; 714/704, 104; 711/103, 711/159, 104, 102, 139, 165, 133, 170; 375/347
See application file for complete search history.

(56) References Cited
U.S. PATENT DOCUMENTS

| | | | | |
|---|---|---|---|---|
| 5,400,389 A | * | 3/1995 | Niiyama et al. ............. 455/418 |
| 5,475,693 A | * | 12/1995 | Christopherson et al. ... 714/710 |
| 6,009,496 A | * | 12/1999 | Tsai ....................... 365/185.09 |
| 6,038,636 A | * | 3/2000 | Brown et al. ................ 711/103 |
| 6,131,040 A | * | 10/2000 | Knuutila et al. .......... 455/550.1 |
| 6,754,894 B1 | * | 6/2004 | Costello et al. ............. 455/419 |
| 6,862,651 B2 | * | 3/2005 | Beckert et al. .............. 711/103 |
| 2002/0052217 A1 | * | 5/2002 | Fukuzumi ................... 455/550 |

* cited by examiner

Primary Examiner—Sam Bhattacharya
(74) Attorney, Agent, or Firm—The Farrell Law Firm, PC

(57) ABSTRACT

A memory device for a mobile phone is provided. The memory device includes a flash memory for storing program data and user data; an interface circuit configured for interfacing the flash memory to a microprocessor; a first memory for copying the program data of the flash memory; and a second memory for executing the program data of the first memory wherein the first and second memories are independent memories. The flash memory is a NAND-type flash memory and the interface circuit is an application-specific integrated circuit (ASIC) including a read-only memory (ROM) for storing program codes and an error correction circuit. Additionally, the first and second memories are preferably random-access memories (RAM). By utilizing a NAND-type flash memory in place of a conventional NOR-type flash memory, the memory device can achieve a larger storage capacity at a lower cost.

14 Claims, 5 Drawing Sheets

MEMORY DEVICE IN MOBILE PHONE

PRIORITY

This application claims priority to an application entitled "MEMORY APPARATUS AND THEREFOR CONTROLLING METHOD FOR MOBILE STATION" filed in the Korean Industrial Property Office on Sep. 7, 2001 and assigned Serial No. 2001-54988, the contents of which are hereby incorporated by reference.

BACKGROUND OF THE INVENTION

1. Field of the Invention

The present invention relates generally to a memory device, and particular, a memory device for a mobile phone having a large capacity at low cost.

2. Description of the Related Art

A memory for an existing mobile phone includes a flash memory for storing a program for controlling the operation and function of the mobile phone and an SRAM (Static Random Access Memory) for executing the program. The flash memory is typically a NOR-type memory that stores user data files as well as the program. The user data may include an address book containing phone numbers and associated user names, e-mail messages and downloaded content from the Internet. In addition to the required operational programs, the memory may also store on-screen images and icons to be used during operation and programming of the phone.

FIG. 1 is a block diagram illustrating a mobile phone 100 employing a conventional memory device 15.

Referring to FIG. 1, a microprocessor (MPU) 20 provides overall control to the operation of the mobile phone 100 by a control program stored in the memory device 15. An analog circuit 40 provides an air-interface to a mobile communication system via antenna ANT and a user-interface 50 provides an interface for a user through an LCD display, keypad, and microphone. A power and reset circuit 60 is provided to reset and initialize the MPU 20 and memory 15 upon start-up of the mobile phone 100. The memory device 15 includes a NOR-type flash memory 10 for storing application programs and user data and a Random Access Memory (RAM) for executing the programs.

In the conventional memory as shown in FIG. 1, the NOR-type flash memory 10 is simply attached to a microprocessor (MPU) 20 so that upon the mobile phone 100 resetting, the MPU 20 generates a dedicated reset vector address, reads a program code from the flash memory 10, and performs a program in the RAM 30 according to a program sequence. Moreover, all user data received through the air, via an antenna ANT, or downloaded from a PC (personal computer) are stored in the NOR-type flash memory 10 being a non-volatile one to be available to a user when necessary.

Storage of user data as well as program data in the NOR-type flash memory imposes cost and space constraints on the manufacture of the existing mobile phone. Especially due to the rising demand for multimedia functions in the mobile phone, the conventional memory structure has the problem that an expensive memory is used for simply storing data. For example, a 4 Mb or above memory is typically used to store one MP3 file.

Therefore, a need exists for a low-cost, large capacity memory device which occupies the same area or smaller than that of a conventional memory device.

SUMMARY OF THE INVENTION

Accordingly, it is an object of the present invention to provide a memory device for a mobile phone which overcomes the disadvantages of conventional memory devices that employ a NOR-type flash memory.

It is another object of the present invention to provide a memory device for a mobile phone having a large capacity at low cost.

The foregoing and other objects are achieved by a memory device for a mobile phone where an expensive NOR-type flash memory is replaced by an inexpensive NAND-type memory and RAM in order to offer a large user data area and reduce memory cost.

According to one aspect of the present invention, a memory device for a mobile phone is provided. The memory device includes a flash memory for storing program data and user data; an interface circuit configured for interfacing the flash memory to a microprocessor; a first memory for copying the program data of the flash memory; and a second memory for executing the program data of the first memory wherein the first and second memories are independent memories. The flash memory is a NAND-type flash memory and the interface circuit is an application-specific integrated circuit (ASIC) including a read-only memory (ROM) for storing program codes and an error correction circuit. Additionally, the first and second memories are preferably random-access memories (RAM).

According to another aspect of the present invention, a mobile communication device, i.e., a mobile phone, is provided. The mobile communications device includes an analog circuit for air interfacing the mobile communication device; a user interface circuit for interfacing between the mobile communication device and a user; a microprocessor (MPU) for providing overall control of the operation of the mobile device; and a memory device including a flash memory for storing program data and user data; an interface circuit for interfacing the flash memory to the microprocessor; a first memory for copying the program data of the flash memory; and a second memory for executing the program data of the first memory wherein the first and second memories are independent memories. The flash memory is a NAND-type flash memory and the interface circuit is an application-specific integrated circuit (ASIC) including a read-only memory (ROM) for storing program codes and an error correction circuit. Additionally, the first and second memories are preferably random-access memories (RAM).

BRIEF DESCRIPTION OF THE DRAWINGS

The above and other objects, features and advantages of the present invention will become more apparent from the following detailed description when taken in conjunction with accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
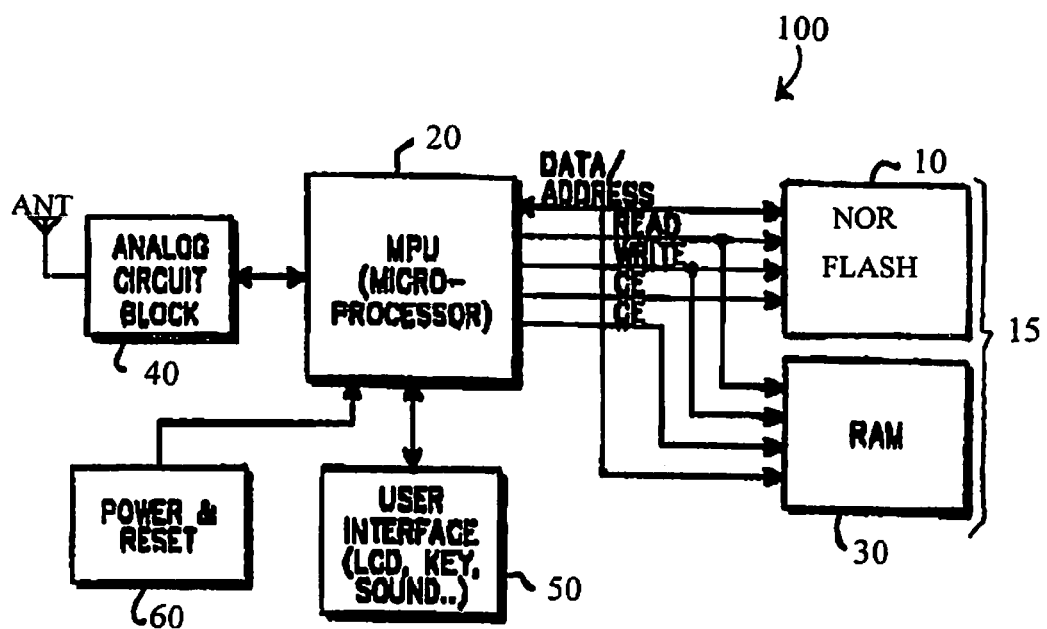
FIG. 1 is a block diagram illustrating a mobile phone employing a conventional memory device.
Figure 2A:
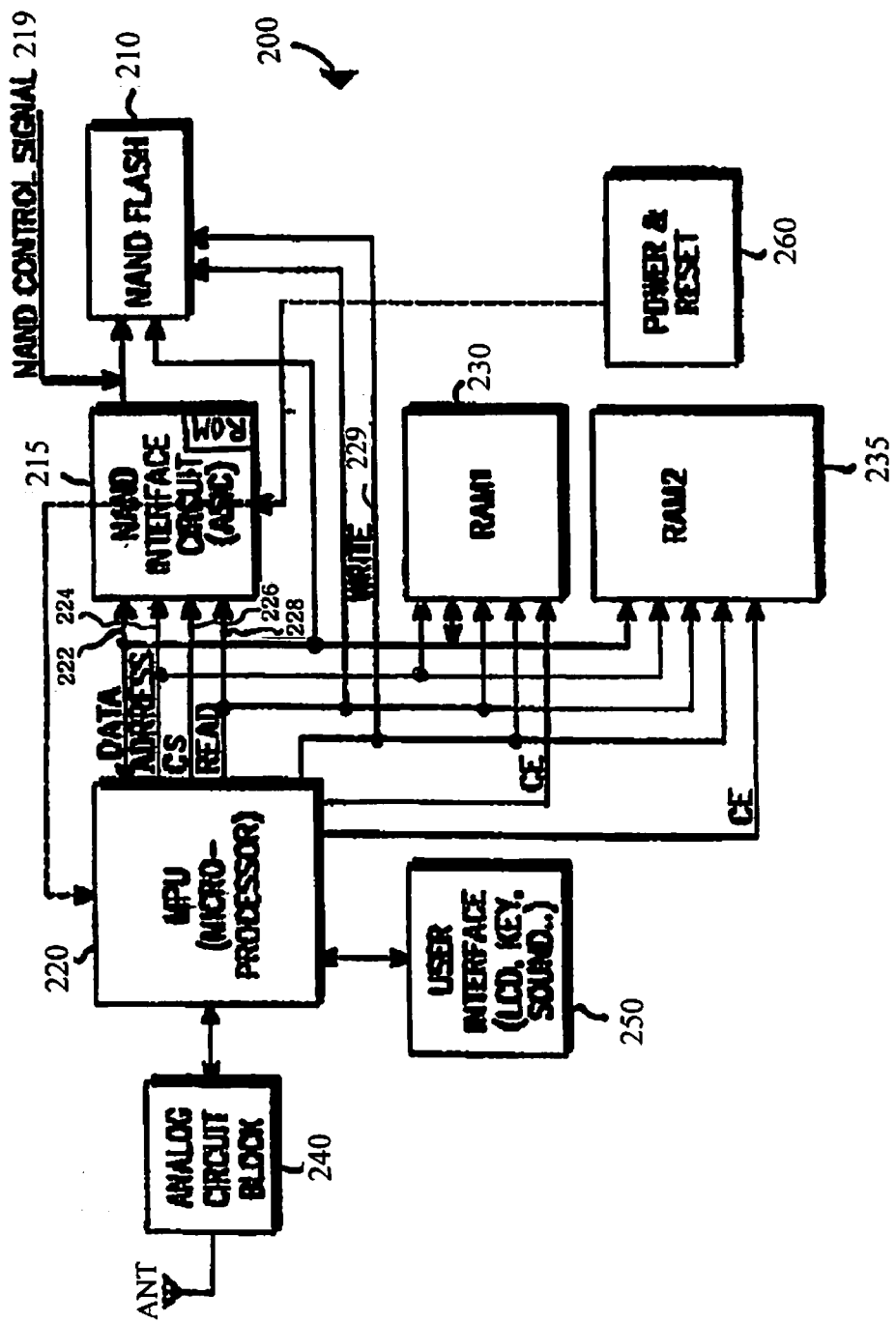
FIG. 2A is a block diagram illustrating a mobile phone employing a memory device according to the present invention.

FIG. 2A is a block diagram illustrating a mobile phone employing a memory device according to the present invention.

The mobile phone 200 includes an analog circuit block 240 for an air-interface, a user interface 250, an MPU 220 for providing overall control over the mobile phone, a NAND interface circuit (ASIC) 215 with a program ROM built therein, a NAND-type flash memory 210, and a first and second RAM 230, 235. The analog circuit block 240 is coupled to an antenna ANT and takes charge of air interfacing the mobile phone 200 to a mobile communication system by transmission/reception and modulation/demodulation of RF and IF signals. The user interface 250, having an LCD, input keys and other indicators, takes charge of interfacing between the mobile phone and a user. The MPU 220 provides overall control over the mobile phone to perform the functions inherent to the mobile phone. Additionally, a power and reset circuit 260 is provided to reset and initialize the MPU 220 and memory upon start-up of the mobile phone 200.

The NAND-type flash memory 210 stores a main program and user data and the RAM 230, 235 is used for executing the main program. The NAND-type flash memory 210 stores all application programs for controlling the operation of the mobile phone and font data for use in displaying messages, and is used as a user data storing area during the operation of the mobile phone. The NAND-type flash memory 210, RAM1 230 and RAM2 235 can be integrated into a multi-chip package (MCP). RAM1 230 is preferably a Random Access Memory (RAM) for copying the program stored in the NAND-type flash memory 210 and RAM2 235 is preferably a working RAM necessary to execute the copied program.

In contrast to the conventional NOR-type flash memory which supports address bus interfacing to the MPU, the NAND-type flash memory 210 is interfaced by loading each command and address on a data bus, and therefore, is provided with NAND interface circuit 215. The NAND interface circuit 215 is preferably an application-specific integrated circuit (ASIC) that includes the program ROM for executing the minimum function required for the MPU 220 and a digital circuit for NAND-type flash memory interfacing, and performs an error control function that may be required during NAND interfacing. The ROM of the ASIC 215 stores program codes for downloading application codes, managing files of the NAND-type flash memory, reading the application program and font data from the NAND-type flash memory and copying them in the RAM, and jumping to a starting address of the RAM. The ROM of the ASIC 215 can be a flash type or a small capacity masking type.

Figure 2B:
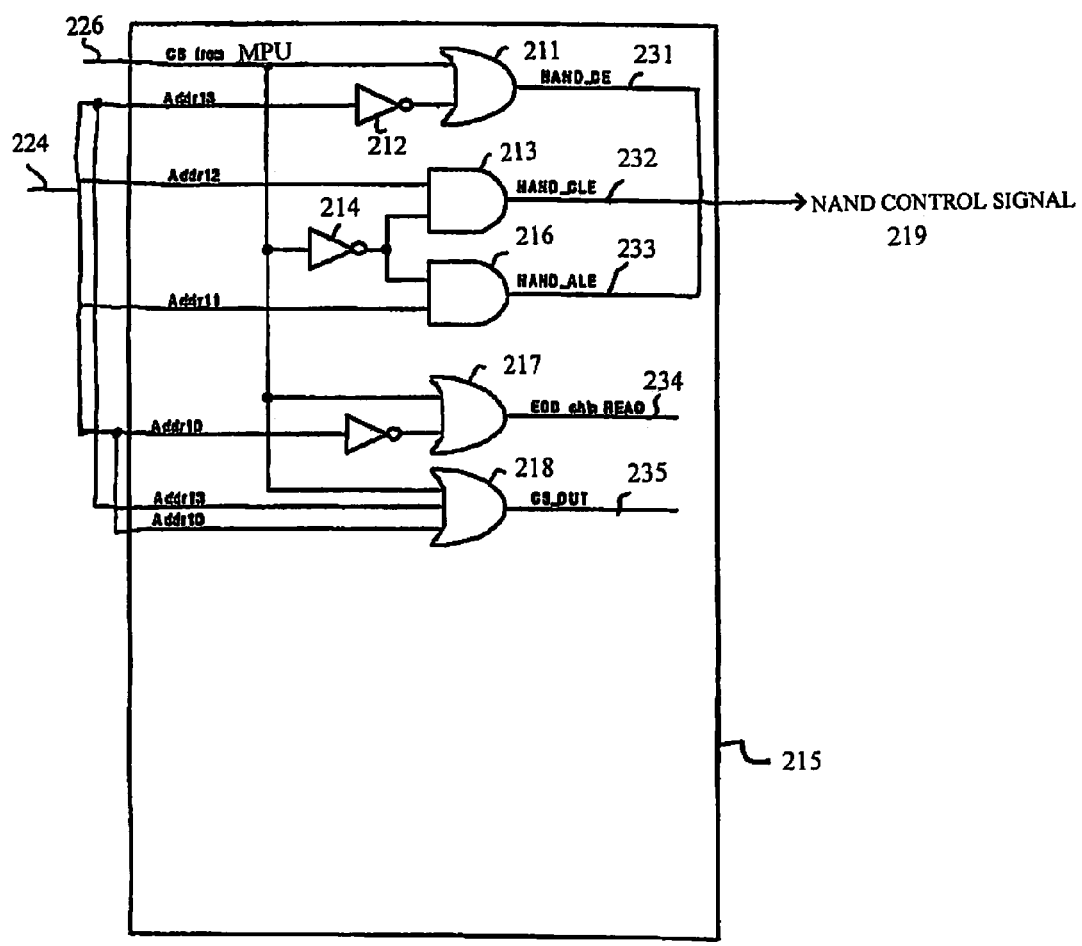
FIG. 2B is a schematic diagram of an interfacing circuit for interfacing a NAND-type flash memory to a microprocessor in accordance with the present invention.
Figure 2C:
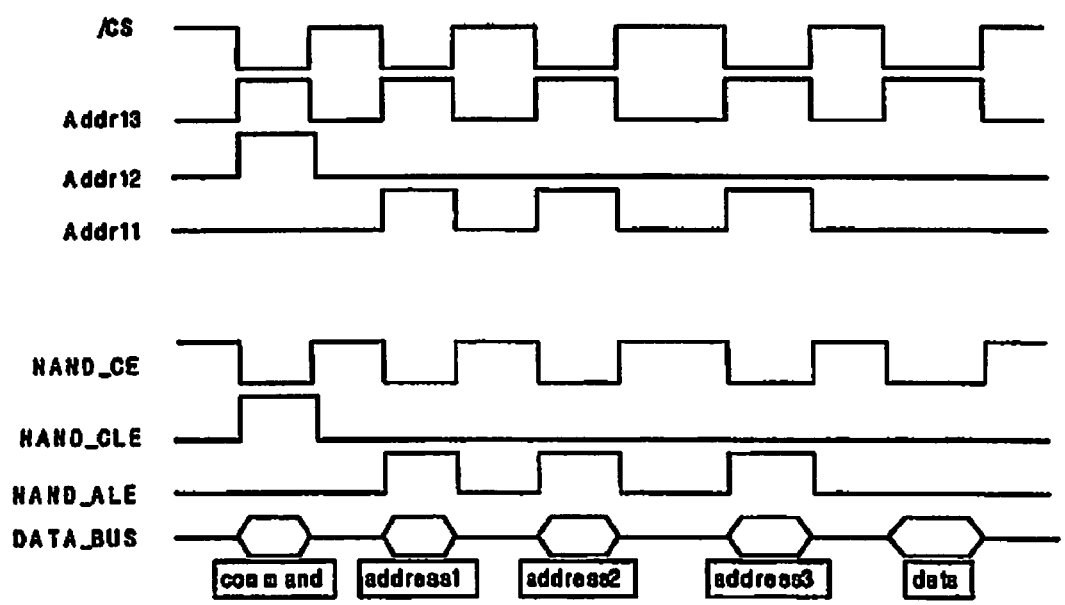
FIG. 2C is a timing diagram for the interfacing circuit of FIG. 2B.

FIG. 2B is a schematic diagram of a digital circuit that makes up the NAND interface circuit 215 for interfacing the NAND-type flash memory 210 to the microprocessor 220, and FIG. 2C is a timing diagram for the interfacing circuit of FIG. 2B. The interfacing of the MPU 220 and the NAND-type flash memory 210 will be described below.

The MPU 220 generally provides several CS (chip select) signals to interface with peripheral devices, such as a memory. Referring to FIGS. 2A and 2B, the NAND-type flash memory 210 is activated by a CS signal 226 and can be interfaced utilizing only three addresses each designating address/command/data. DATA bus 222 loads the address/command/data signal into the NAND interface circuit 215 and ADDRESS bus 224 utilizes three addresses (addr 11, 12, 13) to interface the MPU 220 to the NAND flash memory 210. These addresses are fed into the NAND interface circuit 215 from the MPU 220 and processed by a plurality of logic gates 211, 213, 216 to generate signals 231, 232, 233, which make up a NAND control signal 219, for loading into the NAND-type flash memory 210. Addr 13 is utilized to generate a NAND_CE (chip enable) signal 231. NAND_CE must be input to the NAND flash memory 210 whenever the NAND memory 210 is accessed regardless of the address/command/data signal as shown in FIG. 2C, i.e., NAND_CE signal is always low whenever NAND memory 210 is accessed. Addr 12 is utilized to generate a NAND_CLE (command latch enable) signal 232 for indicating command data is being loaded in DATA bus 222. Addr 11 is utilized to generate a NAND_ALE (address latch enable) signal 233 for indicating address data is being loaded in DATA bus 222. The NAND_CE (chip enable) signal 231, NAND_CLE (command latch enable) signal 232, and NAND_ALE (address latch enable) signal 233 make up the NAND control 219 required to interface the MPU 220 with the NAND-type flash memory 210.

Additionally, a READ pulse 228 and a WRITE pulse 229 is provided from the MPU 220. The READ pulse 228 is generated from the MPU 220 when data is read from the NAND flash memory 210 and is also input to the NAND interface circuit 215 to read ROM code stored therein. The WRITE pulse 229 is generated from the MPU 220 when data is written into the NAND flash memory 210. The NAND interface circuit 215 additionally outputs a CS_OUT (chip select output) signal 235 and an address 234 for selecting an ECC (error correcting code) chip when error correction is necessary.

With reference to FIG. 2C, illustrative examples of writing/reading data to the NAND flash memory 210 will be described. When writing command data, the CS signal 226 goes low and addr 13 goes high resulting in a low NAND_CE signal 231. At the same time, the WRITE pulse 229 is generated from MPU 220 and input to the NAND flash memory 210. Additionally, addr 12 goes high to make NAND_CLE signal 232 go high and indicate that the data in the DATA bus 222 is a command. The command could be "write", "read", etc. When writing address data, the NAND_CE signal 231 goes low while addr 11 goes high to generate NAND_ALE signal 233, which indicates that address is being loaded in the DATA bus 222. The WRITE pulse 229 is also input to the NAND flash memory 210. When writing data, the NAND_CE signal 231 goes low, while at the same time, data to be stored in NAND memory is loaded into the DATA bus 222. In this case neither addr 12 nor addr 11 goes high, which indicates that the data being loaded in the DATA bus 222 is data. The WRITE pulse 229 is also input to the NAND flash memory 210. When reading data, the NAND_CE signal 231 goes low and the READ pulse 228 generated from the MPU 220 is input to the NAND flash memory 210.

In the general operation of the mobile phone, upon the mobile phone resetting during a power-up operation, the MPU 220 accesses the ROM of the ASIC 215, checks the NAND-type flash memory 210 in relation to the program, and if the program is normal, reads the program from the NAND-type flash memory 210 and copies it in RAM1 230. After the program copy, a program counter of the MPU 220 is set to the address of RAM1 and then the copied program is performed. Moreover, if the memory of the ASIC 215 is a RAM, a reset signal from power and reset circuit 260 of the memory is applied first to the ASIC 215 and the ASIC 215 holds the MPU 220 in the reset state until the program is completely copied from the NAND-type flash memory 210 to the RAM1 230. After copying the program, the ASIC 215 releases the MPU 220 from the reset state to operate the MPU 220 normally.

Figure 3:
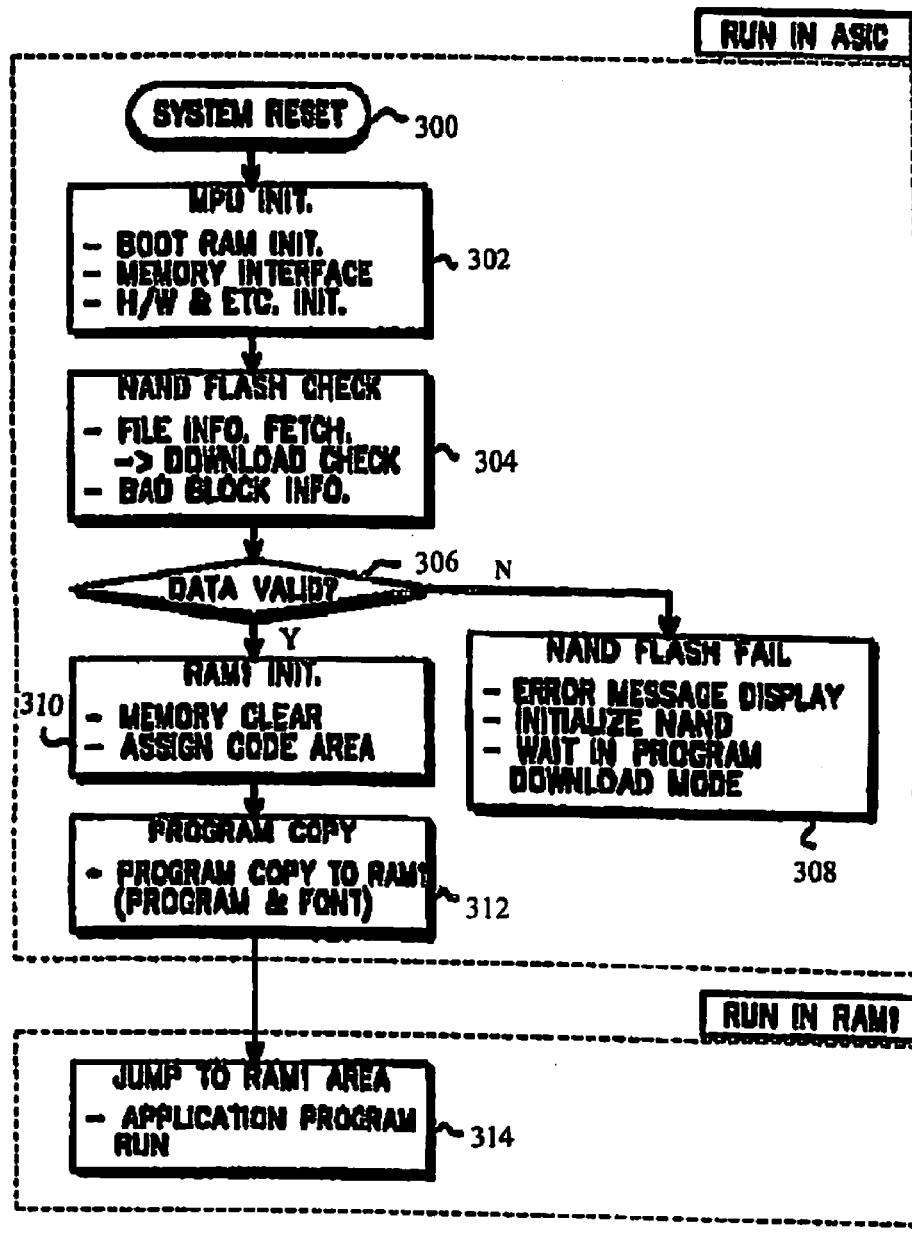
FIG. 3 is a flowchart illustrating an operation of a mobile phone employing the memory device of the present invention.

Referring to FIG. 3, an operation of a memory device for a mobile phone in accordance with the present invention will be described.

When the mobile phone is reset in step 300, the MPU 220 accesses the ROM of the ASIC 215 at address 0 and performs an initialization operation in step 302. In step 302, the MPU 220, boot RAM, ASIC 215 and associated hardware components are initialized. According to the program stored in the ROM of ASIC 215, the MPU 220 checks the contents of the NAND-type flash memory 210 in step 304.

In step 306, the data retrieved in step 304 is validated. If the data is found to be valid, RAM1 230 is initialized in step 310. During the initialization process of RAM1 230, its memory is cleared and it is assigned a code area address. In step 312, the program stored in the NAND-type flash memory 210 is copied into RAM1 230. After the copy operation is completed, the MPU 220 sets the value of its internal programs counter as the starting address of RAM1 230 and jumps to the starting address of RAM1 230 to perform the copied application program in step 314.

If during step 306 it is found that a normal application program is not stored in the NAND-type flash memory 210, the NAND-type flash memory 210 is initialized and a download standby mode is entered to download normal application programs in step 308. An appropriate message can be displayed on a display of the user interface 250 so that the user can view the program execution state of the memory when the application program is copied from the NAND-type flash memory 210 to the RAM or the download standby state is entered.

In accordance with the present invention, the conventional NOR-type flash memory for storing an application program is replaced by an inexpensive large-capacity NAND-type flash memory and RAM, thereby reducing memory cost. In particular, substitution of a pseudo-SRAM for the RAM for executing the application program is more beneficial. The use of the inexpensive, large-capacity NAND-type flash memory secures a large storage area for a user with low cost.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A memory device for a mobile phone comprising:
   a flash memory for storing program data and user data;
   an interface circuit for copying program data stored in the flash memory according to whether data stored in the flash memory is valid;
   a first Random Access Memory (RAM) for providing an operation area to store and execute the copied program data; and
   a second RAM for storing data generated during the execution of program data,
   wherein the first and second RAMs are independent memories,
   wherein the interface circuit comprises a first logic gate for generating a NAND CE (chip enable) signal, said NAND CE signal enabling the flash memory, and
   wherein the interface circuit further comprises a second logic gate for generating a CLE (command latch enable) signal, said CLE signal informing the flash memory that incoming data is a command.

2. A memory device as in claim 1, wherein the flash memory is a NAND-type flash memory.

3. A memory device as in claim 1, wherein the interface circuit is an application-specific integrated circuit (ASIC) including a read-only memory (ROM) for storing program codes and an error correction circuit.

4. A memory device as in claim 1 wherein the interface circuit further comprises a third logic gate for generating a ALE (address latch enable) signal, said ALE signal informing the flash memory that incoming data is an address.

5. A memory device as in claim 4 wherein the third logic gate is an AND gate for receiving an address signal from the microprocessor and a CS (chip select) signal from the microprocessor for generating said ALE signal.

6. A memory device as in claim 1 wherein the first logic gate is an OR gate for receiving a CS (chip select) signal from the microprocessor and a CE (chip enable) signal from the microprocessor for generating said NAND CE signal.

7. A memory device as in claim 1 wherein the second logic gate is an AND gate for receiving a command signal from the microprocessor and a CS (chip select) signal from the microprocessor for generating said CLE signal.

8. A mobile communication device comprising:
   an analog circuit for air interfacing the mobile communication device;
   a user interface circuit for interfacing between the mobile communication device and a user;
   a microprocessor (MPU) for providing overall control of the operation of the mobile device; and
   a memory device including
   a flash memory for storing program data and user data;
   an interface circuit for interfacing the flash memory to the microprocessor, wherein the interface circuit is an application-specific integrated circuit (ASIC) including a read-only memory (ROM) for storing program codes and an error correction circuit;
   a first memory for copying the program data of the flash memory; and
   a second memory for executing the program data of the first memory,
   wherein the first and second memories are independent memories,
   wherein the interface circuit comprises a first logic gate for generating a NAND CE (chip enable) signal, said NAND CE signal enabling the flash memory, and
   wherein the interface circuit further comprises a second logic gate for generating a CLE (command latch enable) signal, said CLE signal informing the flash memory that incoming data is a command.

9. A mobile communication device as in claim 8 wherein the flash memory is a NAND-type flash memory.

10. A mobile communication device as in claim 8 wherein the first and second memories are random-access memories (RAM).

11. A mobile communication device as in claim 8 wherein the interface circuit further comprises a third logic gate for generating a ALE (address latch enable) signal, said ALE signal informing the flash memory that incoming data is an address.

12. A mobile communication device as in claim 11 wherein the third logic gate is an AND gate for receiving an address signal from the microprocessor and a CS (chip select) signal from the microprocessor for generating said ALE signal.

13. A mobile communication device as in claim 8 wherein the first logic gate is an OR gate for receiving a CS (chip select) signal from the microprocessor and a CE (chip enable) signal from the microprocessor for generating said NAND CE signal.

14. A mobile communication device as in claim 8 wherein the second logic gate is an AND gate for receiving a command signal from the microprocessor and a CS (chip select) signal from the microprocessor for generating said CLE signal.

* * * * *